Dec. 18, 1923.　　　　　　　　　　　　　　　　　1,477,764
J. OVERN, JR
SHAFT BEARING FOR HYDRAULIC MACHINES
Original Filed May 13, 1921　　2 Sheets-Sheet 1
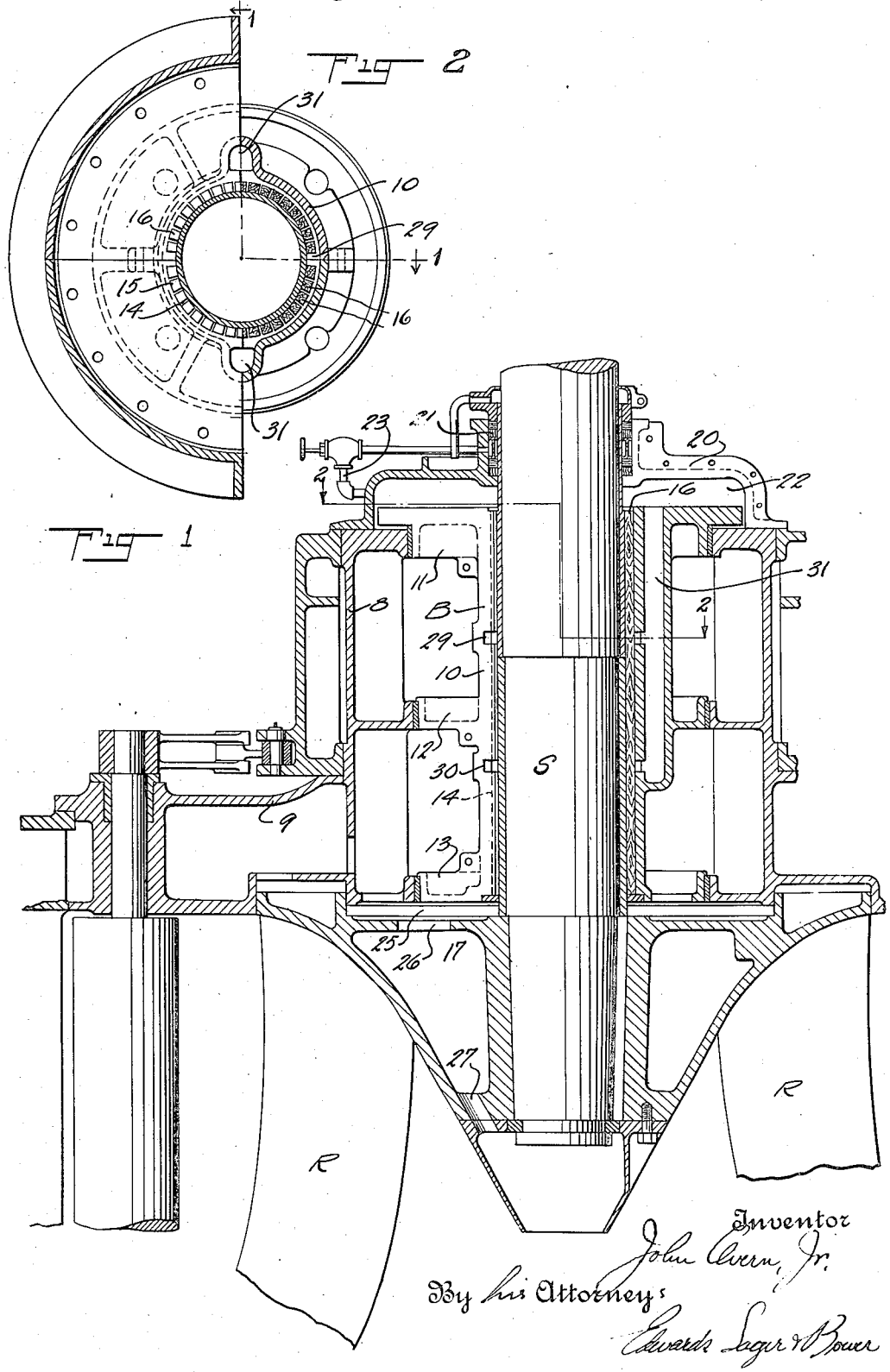

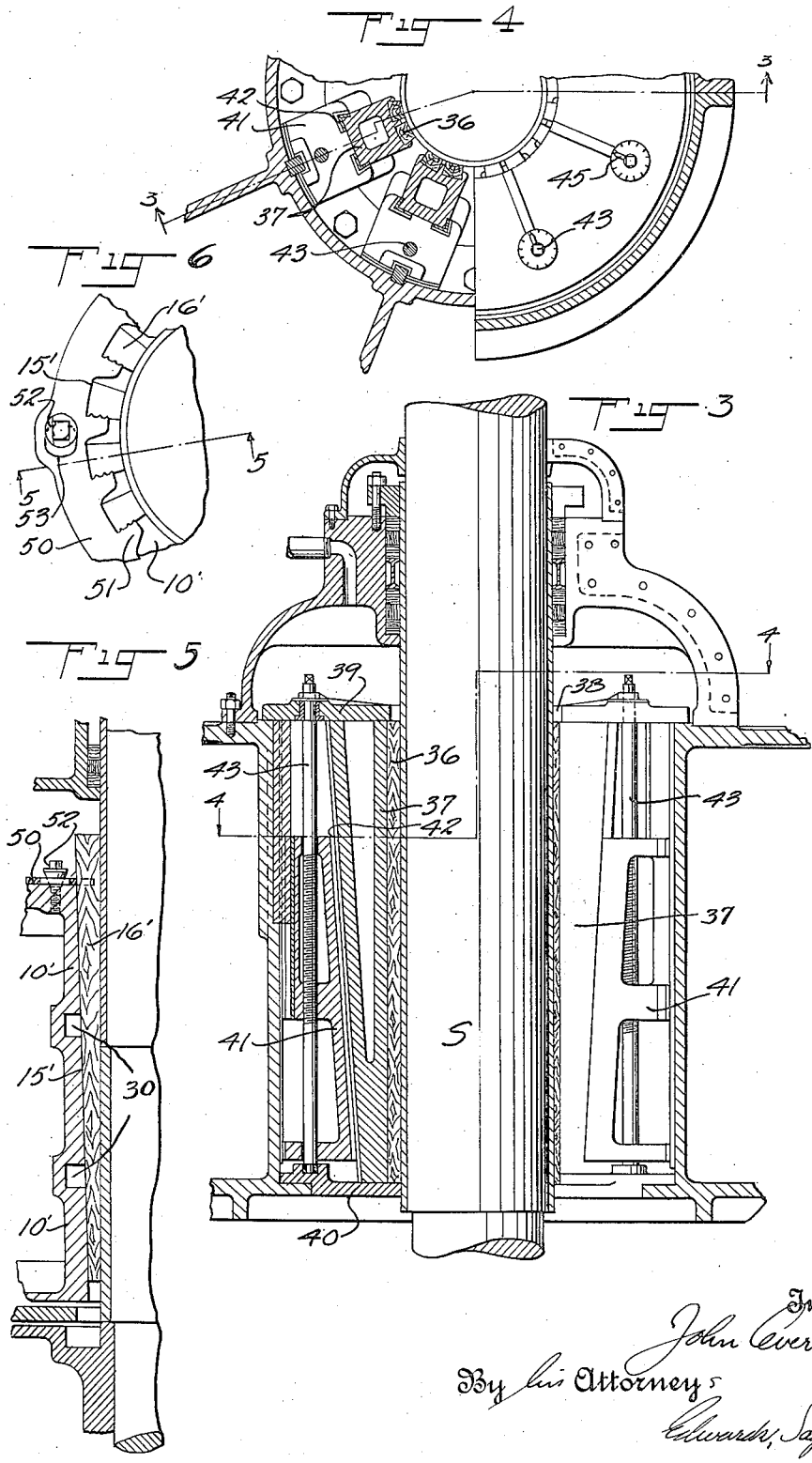

Patented Dec. 18, 1923.

1,477,764

UNITED STATES PATENT OFFICE.

JOHN OVERN, JR., OF PHILADELPHIA, PENNSYLVANIA, ASSIGNOR TO WILLIAM CRAMP & SONS SHIP AND ENGINE BUILDING COMPANY, A CORPORATION OF PENNSYLVANIA.

SHAFT BEARING FOR HYDRAULIC MACHINES.

Application filed May 13, 1921, Serial No. 469,361. Renewed August 20, 1923.

*To all whom it may concern:*

Be it known that I, JOHN OVERN, Jr., a citizen of the United States, residing at Philadelphia, in the county of Philadelphia and State of Pennsylvania, have invented certain new and useful Improvements in Shaft Bearings for Hydraulic Machines, of which the following is a specification.

This invention relates to hydraulic turbines, pumps, etc., and particularly to the shaft bearings therefor. The object of the invention is to provide such a bearing that will be durable in service and adapted to accurately adjust the bearing surfaces to the shaft so as to maintain the desired clearance between the rotatable parts and the surrounding stationary casing.

Further objects of the invention, particularly in the lubrication and adjustment of the bearing will appear from the following description taken in connection with the accompanying drawings, in which, Fig. 1 is a vertical sectional view of a bearing taken on the line 1—1 of Fig. 2 and illustrating one embodiment of the invention, and Fig. 2 is a plan view of the same with the parts in section on line 2—2 of Fig. 1;

Fig. 3 is a partial sectional view taken on the line 3—3 of Fig. 4 and illustrating a modified form of my invention.

Fig. 4 is a partial plan view of Fig. 3 with parts in section taken on line 4—4 of Fig. 3;

Fig. 5 is a sectional view of a further modification of the means for radially adjusting the bearing strips, and Fig. 6 is a plan view of a portion of Fig. 5.

In shaft bearings for turbines and particularly vertical turbines and pumps, it is often advantageous to use bronze, Babbit metal, lignum vitæ or similar anti-friction material in strips for the wearing surface. The lateral load is small, being only that due to an unbalance of the rotor parts, and by providing for adjustment of the bearing surfaces to take up unequal wear accurate positioning of the bearing surfaces may be maintained to give the desired running clearance. The lignum vitæ type of bearing permits the bearing surfaces to be brought close to the runner and lubricated by water without special oil supply and return means. The lubricating water is drawn from the supply and flows downward through the bearing to the runner. In practice it is important to maintain this lubrication constant throughout the entire extent of the bearing as otherwise the unlubricated portions are apt to burn out, necessitating the replacement of the entire bearing. In many turbines and particularly when the flow contains silt and mud the water passage through the bearing often becomes obstructed so that the lubrication of the lower portions of the bearing is impeded with resultant rapid wear and failure. To avoid this obstruction and to maintain permanent and even lubrication of the bearing the structure of this invention provides a distribution of the water supply to the bearing surfaces with inlets at successive portions of the bearing.

In the embodiment of the invention shown in Figs. 1 and 2, a runner R has its shaft S provided with a bearing B above the runner. The bearing is carried by cylinder 8 projecting upward from the cover casting 9 of the turbine and the bearing comprises a cylindrical body portion 10 with outwardly extending annular flanges 11, 12, 13, holding the bearing in place in the turbine cover. The inner surface 14 of the body portion 10 is provided with grooves 15 for lignum vitæ bearing strips 16, the sides of the grooves being radially directed so as to converge inward and form a dove-tail into which the strips 16 are tightly fitted with narrow spaces between them and held by a ring 17 at the bottom.

A bearing cover 20 is provided at the top and packed as at 21 and forms a top space 22 to receive the lubricating water for instance from pipe 23. The water from this space finds its way down between the strips 16 to the bottom of the bearing where it discharges into the lower space 25 and passes out through the runner hub by openings 26, 27.

If there is any deposit of obstructive matter it will tend to accumulate at the upper portions of the spaces between the lignum vitæ strips so that the lower parts are not sufficiently lubricated and this often results in serious damage to the bearing.

To avoid this gathering of obstruction and uneven lubrication the bearing of this invention has the water supply area increased and distributed instead of being confined to the top of the bearing. In the body portion 10 annular grooves 29, 30 are cut at intermediate points as shown, these grooves being deep enough to provide a clear annular passage around the strips 16, and openings from the grooves to the bearing surfaces are provided by spaces between the strips.

Auxiliary supply passages 31 are provided leading from space 22 to these grooves so that the water supply is distributed all around the bearing surfaces at three successive points and this distribution of the lubrication may be increased if desired by enlarging the grooves or increasing their number. In this way the bearing receives an increasing amount of water toward the lower portions and all of the water does not have to pass through the top. The result is a decreased accumulation of obstructive deposit and an independent lubrication of successive parts of the bearing.

In the modification illustrated in Figs. 3 and 4, the lignum vitæ strips 36 are carried in pairs on separate holders 37 and these holders are spaced apart throughout their length so that the bearing surfaces are entirely open and the lubricating water flowing down through the central opening 38 of plate 39 is distributed throughout the length of the bearing. The holders 37 are of inverted wedge form slidable radially in grooves in the upper plate 39 and lower plate 40 so that any pair of strips 36 may be independently adjusted to take up wear and center the shaft S. In order to hold and move these holders 37 the wedges 41 are provided one for each holder and slidably dove-tailed together as shown at 42 (Fig. 4). A screw shaft 43 journaled in lower plate 40 and through upper plate 39 is threaded in each wedge 41 to move the latter and indicators 45 may be provided showing the relative adjustment of these wedges.

In the modification shown in Figs. 5 and 6 the grooves 15' in the body portion 10' are tapered downward and the strips 16' are similarly tapered so that radial adjustment may be effected by moving the desired strips lengthwise in their grooves. To clamp the strips in place a ring 50 at the top of the body 10' has projections 51 engaging and gripping against the sides of the strips, and this ring is fastened in gripping position by wedge screws 52 working against the ends of slots 53 and releasable to permit the ring to be turned out of clamping engagement with the strips. It will of course be understood that this method of adjusting the bearing strips is preferably employed with some means for admitting water between the strips, such for example, as is shown in Figs. 1 and 2.

The bearing of this invention is made by simple operations of boring and planing and is accessible from the top for inspection and adjustment. The thorough lubrication avoids any excessive wear and the adjustment of the bearing surfaces further avoids the necessity of frequent replacement, so that the bearing is durable and maintains the turbine in continuous operation.

I claim:

1. A bearing for hydraulic machines comprising longitudinal bearing strips and means for admitting water to said strips at a plurality of points in the length of said bearing.

2. A bearing for hydraulic machines comprising longitudinal bearing strips spaced apart, and means for admitting water between said strips to the bearing surfaces at a plurality of points in the length of said bearing.

3. A bearing for hydraulic machines comprising a plurality of radially shiftable bearing strips, and means for admitting water between said strips to the bearing surfaces at a plurality of points in the length of said bearing.

4. A bearing for hydraulic machines comprising a cylindrical body portion having longitudinal grooves in its inner surface, and bearing strips in said grooves, said cylindrical body having an annular groove around said inner surface adapted to supply water between said strips to the bearing surfaces.

5. In a bearing for hydraulic machines the combination with a plurality of longitudinal bearing strips, of means for supplying water radially between said strips to the bearing surfaces.

6. A bearing for hydraulic machines comprising a plurality of radially shiftable bearing strips, means for holding said strips in shifted position, and means for admitting water between said strips to the bearing surfaces at a plurality of points in the length of said bearing.

7. A bearing for hydraulic machines comprising a plurality of radially shiftable bearing strips, means for holding said strips in shifted position, and means for admitting water between said strips to the bearing surfaces at a plurality of points in the length of said bearing, said strips being adjustable from one end of said bearing.

8. A bearing comprising bearing strips and a bearing strip support having mating tapered surfaces, and separate clamping means common to all of said wedges and adapted to engage said strips to hold them in adjusted position.

9. A bearing comprising bearing strips and a bearing strip support having mating tapered surfaces, and separate clamping means common to all of said wedges and adapted to engage the ends of said strips to hold them in adjusted position.

10. A shaft bearing having a body portion formed with longitudinal grooves, bearing strips located in said grooves and movable therein to adjust said strips radially of said shaft, a plate provided with a plurality of clamping faces arranged to engage the said strips and means for causing said plate to clamp said strips.

11. A shaft bearing having a body portion formed with longitudinal grooves, bearing strips located in said grooves and movable therein to adjust the said strips radially of said shaft, an annular plate provided with a plurality of radially extending clamping faces arranged to engage the said strips and means for turning said plate to cause the same to clamp said strips.

12. A bearing for hydraulic machines comprising supporting means for bearing strips, a series of longitudinally extending bearing strips carried by said supporting means with spaces between said strips, means for adjusting certain of said strips in a radial direction independently of the remaining strips so as to compensate for unequal wear at different parts of the bearing, means for holding said strips in adjusted position, and means for admitting water to the bearing surfaces.

13. A bearing for hydraulic machines comprising supporting means for bearing strips, a series of longitudinally extending bearing strips carried by said supporting means with spaces between said strips, means for adjusting certain of said strips in a radial direction independently of the remaining strips so as to compensate for unequal wear at different parts of the bearing, means for holding said strips in adjusted position, and means for admitting water between said strips at an intermediate point of the bearing.

14. A bearing for hydraulic machines comprising supporting means for bearing strips, a series of longitudinally extending bearing strips carried by said supporting means with spaces between said strips certain of said strips when moved longitudinally being radially adjustable independently of the remaining strips so as to compensate for unequal wear at different parts of the bearing, means for holding said strips in adjustable position, and means for admitting water to the bearing surfaces.

JOHN OVERN, Jr.